United States Patent
Bedare et al.

(10) Patent No.: US 10,275,016 B2
(45) Date of Patent: Apr. 30, 2019

(54) SMART POWER ADAPTERS AND RELATED SYSTEMS AND METHODS

(71) Applicant: INTEL CORPORATION, Santa Clara, CA (US)

(72) Inventors: Sachin Bedare, Bangalore (IN); Ayeshwarya Mahajan, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/976,366

(22) Filed: Dec. 21, 2015

(65) Prior Publication Data
US 2017/0177069 A1    Jun. 22, 2017

(51) Int. Cl.
| | |
|---|---|
| G06F 1/00 | (2006.01) |
| G06F 1/26 | (2006.01) |
| G06F 1/32 | (2006.01) |
| G06F 1/3296 | (2019.01) |
| G06F 1/3206 | (2019.01) |
| G06F 1/3203 | (2019.01) |
| G06F 1/3212 | (2019.01) |

(52) U.S. Cl.
CPC ............ *G06F 1/3296* (2013.01); *G06F 1/263* (2013.01); *G06F 1/3203* (2013.01); *G06F 1/3206* (2013.01); *G06F 1/3212* (2013.01); *Y02D 10/172* (2018.01); *Y02D 10/174* (2018.01)

(58) Field of Classification Search
CPC ........................................................ G06F 1/32
See application file for complete search history.

(56) References Cited

U.S. PATENT DOCUMENTS

| | | | | |
|---|---|---|---|---|
| 5,289,362 A * | 2/1994 | Liebl | ...................... | G06Q 50/06 165/268 |
| 5,758,054 A * | 5/1998 | Katz | ...................... | G06F 11/08 365/228 |
| 5,799,200 A * | 8/1998 | Brant | .................. | G06F 11/1441 365/229 |
| 9,674,590 B2 * | 6/2017 | Park | ........................ | H04Q 9/00 |
| 9,807,694 B2 * | 10/2017 | Yoon | ..................... | G06F 3/0488 |
| 9,846,920 B2 * | 12/2017 | Costa | ...................... | G06F 3/041 |

(Continued)

OTHER PUBLICATIONS

PCT/US2016/059442, International Search Report and Written Opinion, dated Feb. 10, 2017, 17 pages.

*Primary Examiner* — Mohammed H Rehman
(74) *Attorney, Agent, or Firm* — Stoel Rives LLP

(57) ABSTRACT

Disclosed are electrical systems and electronic devices. An electrical system includes an electronic device. The electronic device is configured to receive external power from an external power source, the external power sufficient to support normal mode operation of the electronic device. The electronic device includes control circuitry programmed to operate in the normal mode while receiving external power, and transition to one of a low power mode and a pre-shutdown mode responsive to sensor inputs. An electronic device includes an internal power source configured to provide internal power sufficient to support low power requirements of the electronic device operating in a low power mode, but not sufficient to support normal power requirements of a normal mode. The electronic device includes control circuitry programmed to transition from the low power mode to a hibernate mode while powered by only the internal power source.

24 Claims, 5 Drawing Sheets

(56) References Cited

U.S. PATENT DOCUMENTS

| | | | |
|---|---|---|---|
| 9,861,015 B2 * | 1/2018 | Sagneri | H05K 7/209 |
| 2006/0222055 A1 * | 10/2006 | Khodorkovsky | H01R 13/7038 |
| | | | 375/142 |
| 2008/0062586 A1 * | 3/2008 | Apfel | H04L 12/10 |
| | | | 361/18 |
| 2011/0273157 A1 * | 11/2011 | Abu-Qahouq | H02M 3/156 |
| | | | 323/299 |
| 2012/0054520 A1 | 3/2012 | Ben-Tsion | |
| 2012/0303990 A1 | 11/2012 | Nanda et al. | |
| 2013/0166864 A1 | 6/2013 | Yerushalmi et al. | |
| 2014/0312691 A1 | 10/2014 | Doljack et al. | |
| 2015/0029808 A1 | 1/2015 | Allison et al. | |
| 2015/0177817 A1 * | 6/2015 | Badri | G06F 1/3268 |
| | | | 713/320 |
| 2015/0373022 A1 * | 12/2015 | Dubman | H04L 63/10 |
| | | | 713/320 |
| 2016/0024766 A1 * | 1/2016 | Sawaski | E03C 1/055 |
| | | | 4/668 |

\* cited by examiner

SMART POWER ADAPTERS AND RELATED SYSTEMS AND METHODS

TECHNICAL FIELD

The disclosure relates generally to the field of power management for electronic devices having limited internal power sources, and more specifically to power management when a potential power disconnect is detected.

BACKGROUND

Size of electronic devices has progressively become smaller and smaller over time (e.g., with Moore's law observation that transistor density in integrated circuits doubles about every two years). As a result, electronic devices today may be implemented in relatively small form factors. For example, some electronics manufacturers offer ultra-small form factor computing devices (also known as High-Definition Multimedia Interface (HDMI) sticks, compute sticks, etc.), which include a computer executing an operating system in a form factor similar in size to a human thumb. These ultra-small form factor computing devices typically rely on external power because batteries that fit inside such small form factors do not provide enough power to support normal execution of an operating system. Other electronic devices implemented in relatively small form factors include portable data storage devices (e.g., jump drives, portable hard drives, Flash drives, etc.), portable printers, etc. Some of these electronic devices may also lack sufficient internal power sources to operate the electronic devices in full power modes.

DETAILED DESCRIPTION OF PREFERRED EMBODIMENTS

Figure 1:
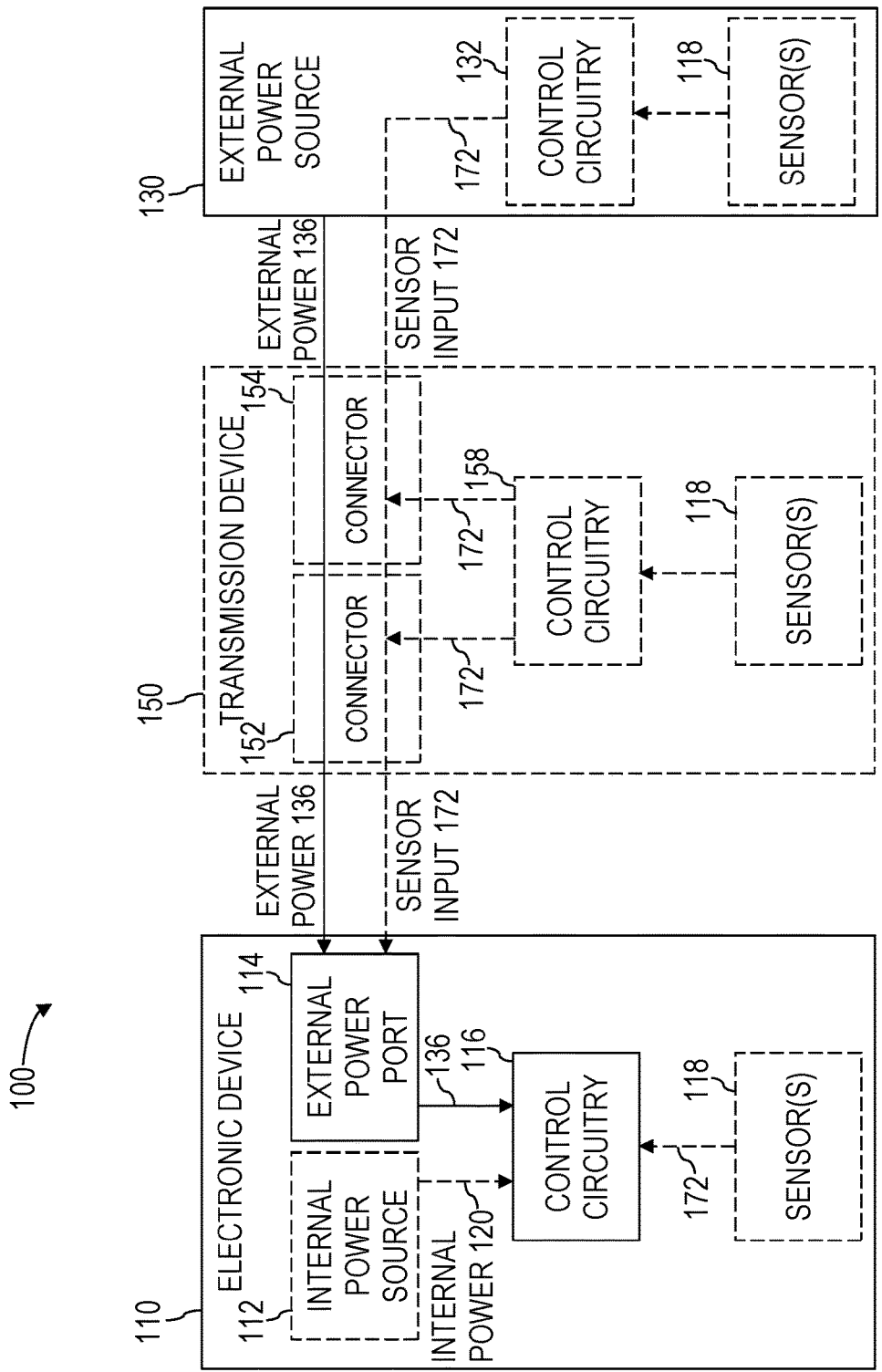
FIG. 1 is a simplified block diagram of an electrical system.

In the following detailed description, reference is made to the accompanying drawings, which form a part hereof, and in which is shown by way of illustration specific embodiments in which the present disclosure may be practiced. These embodiments are described in sufficient detail to enable those of ordinary skill in the art to practice the disclosure made herein. It should be understood, however, that the detailed description and the specific examples, while indicating examples of embodiments of the disclosure, are given by way of illustration only, and not by way of limitation. From the disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method. Also, some of the drawings (i.e., FIGS. 1, 2, and 3) include elements depicted with broken lines, which emphasize that such elements are optional (although lack of emphasis of optionality in other elements is not necessarily intended to indicate that the other elements are mandatory).

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, a signaling diagram, or a block diagram. Although a flowchart or signaling diagram may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media (i.e., non-transitory media) and communication media including any medium that facilitates transfer of a computer program from one place to another.

Disclosed herein are smart power adapters, and related systems and methods. In some embodiments, disclosed herein is an electrical system. The electrical system includes an electronic device including an external power port and control circuitry operably coupled to the external power port. The external power port is configured to receive external power from an external power source that is external to the electronic device. The external power is sufficient to support normal power requirements of the electronic device operating in a normal mode. The control circuitry is configured to receive sensor inputs from one or more sensors configured to detect events associated with a future disconnect of the external power port from the external power source. The control circuitry is programmed to operate in the normal mode while the external power port is receiving the external power, and transition to one of a low power mode and a pre-shutdown mode responsive to the sensor inputs.

In some embodiments, disclosed herein is an electronic device. The electronic device includes an external power port, an internal power source, and control circuitry operably coupled to the external power port and the internal power source. The external power port is configured to receive external power from an external power source that is external to the electronic device. The external power is sufficient to support normal power requirements of the electronic device operating in a normal mode. The internal power source is configured to provide internal power sufficient to support low power requirements of the electronic device operating in a low power mode, but not sufficient to support the normal power requirements. The control circuitry includes at least one or more central processing units, one or more volatile data storage devices, and one or more non-volatile data storage devices. The control circuitry is programmed to transition from the low power mode to a hibernate mode while powered by only the internal power source.

As used herein, the term "normal mode" of an electronic device refers to an operational mode of the electronic device in which normal (e.g., full) operation occurs. Normal power requirements of an electronic device correspond to power required to operate the electronic device in the normal mode. For example, if the electronic device executes a software operating system (e.g., a full operating system, a mobile operating system, etc.), the corresponding normal mode may include the electronic device executing the software operating system at normal (e.g., full) power. As another example, if the electronic device is a portable printer, the corresponding normal mode may include the portable printer operating with a printer head in printing position, as opposed to a safely stowed position. As a further example, if the electronic device is a portable image projection device, the corresponding normal mode may include the portable projector operating with a light source and thermal solution operating in a fully operational mode.

As used herein, the term "low power mode" of an electronic device refers to an operational mode of the electronic device in which an internal power source of the electronic device provides sufficient power to support partial functionality of the electronic device for at least a moderate amount of time (e.g., about fifteen minutes to several hours, but less than about ten hours). Low power requirements of the electronic device correspond to power required to operate the electronic device in the low power mode, which are less than the normal power requirements corresponding to the normal mode. In a low power mode, full normal operation is not occurring. For example, if the electronic device executes a software operating system, the corresponding low power mode may include the electronic device executing the software operating system in a scaled-back mode (e.g., a clock of a CPU may be scaled back, certain functions may be disabled, etc.) so that less power is consumed.

As used herein, the term "hibernate mode" of an electronic device refers to a mode of the electronic device that may be supported by an internal power source for extended periods of time (e.g., at least about ten hours). For example, if the electronic device executes a software operating system, the corresponding hibernate mode may include operating with most or all components of control circuitry (e.g., volatile data storage, non-volatile data storage, central processing units (CPUs), etc.) disabled. As volatile data storage generally uses a relatively significant amount of power to maintain data stored thereon, a hibernate mode of an electronic device executing a software operating system would typically involve a disabled volatile data storage.

As used herein, the term "pre-shutdown mode" of an electronic device refers to a mode of the electronic device in which certain features that may cause adverse effects if not properly prepared before loss of power are prepared for loss of power. For example, if the electronic device is a portable printer, a pre-shutdown mode may include the portable printer operating with a printer head safely stowed, as opposed to the printer head being engaged in a printing position (if the printer head is stuck in an engaged position at power down, mechanical motion of the portable printer may damage the printer head). As another example, if the electronic device is a portable image projection device, a light source and thermal management circuitry may be strategically shut down to reach a corresponding pre-shutdown mode, as opposed deactivated responsive to power loss, which may extend an operational life of the portable image projection device. As a further example, a pre-shutdown mode of a security system may include an operational mode in which information regarding a manual disconnect from power is stored before the manual disconnect to enable later discernment between tampering and other power failures. Other examples of pre-shutdown modes correspond to systems that do not include internal power supplies, such as portable data storage devices (e.g., Flash drives, portable hard drives, other portable data storage devices, etc.). Preparatory acts may prevent data loss in such portable data storage devices.

As used herein, the term "ultra-small form factor computing device" refers to computing devices implemented in form factors that are too small to include therein internal power sources capable of providing sufficient power to support a normal mode of the computing devices. One example of an ultra-small form factor computing device is a High-Definition Multimedia Interface (HDMI) stick. A specific non-limiting example of an HDMI stick is the Compute Stick, which is produced by Intel Corporation of Santa Clara, Calif.

Advance warning of a possible disconnect from an external power source would be helpful for many different electronic devices to enable these devices to transition from a normal mode to one of a low power mode and a pre-shutdown mode before external power is disconnected.

One example of such electronic devices are ultra-small form factor computing devices (sometimes referred to herein simply as "computing devices"). These computing devices provide high power computing capabilities, which may be similar to those provided by laptop computers, tablet computers, smartphones, personal digital assistants (PDAs), etc. Consumers have become accustomed to disconnecting laptop computers, tablet computers, tablet computers, smartphones, and PDAs from external power during normal operation of these devices, which typically does not cause problems because of sufficient internal battery power to support normal operation for at least moderate amounts of time. Accordingly, it may be natural for a user to disconnect an ultra-small form factor computing device from external power without manually switching to a low power mode or a hibernate mode, and/or without thinking of or realizing the consequences of doing so.

Ultra-small form factor computing devices, however, are not capable of supporting normal operation with internal power sources if disconnected from external power sources during normal mode operation. These computing devices can accommodate only relatively small batteries (e.g., on the order of 1/100th of laptop battery capability). These relatively small batteries have limited output power capabilities, and both instantaneous and total power capabilities of batteries tend to be proportional to the battery size. As a result, small batteries typically cannot support normal mode operation. Accordingly, when external power is disconnected from these computing devices during normal mode operation, data stored in volatile data storage may be lost. Also, the next time these computing devices are powered up, they may enter a cold boot process, which may take relatively longer than a normal boot process, and which may inconvenience a user. If even a relatively small amount of advanced notice were provided before external power was disconnected, these computing devices could relatively quickly transition to a low power mode supportable by the relatively small batteries (switching to a low power mode may occur in about a millisecond, which is instantaneous to human perception). As a result, data loss, cold boots, and other system stresses may be prevented.

Another example of an electronic device where advance notice of a disconnect from external power would be helpful is a portable printer. Portable printers include printer heads, which are positioned in a printing position during normal operation. When power is not connected to portable printers, the printer heads ideally are positioned in a safely stowed position because printer heads are prone to breaking due to mechanical shock when in the printing position. If power is disconnected from a portable printer while the printer head is in the printing position, the printer head may remain in the printing position after external power is disconnected. If advanced notice were provided before a disconnect of external power, the portable printer could move the printer head to the safely stowed position before the disconnect. As a result, damage to the printer head may be prevented.

A further example of an electronic device where advance notice of a disconnect from external power would be helpful is a portable image projection device. Advanced notice of external power disconnects would be helpful to enable a portable image projection device to properly and methodically shut down its light source and thermal solution features, which may prolong operational life of the portable image projection device.

Security systems could also benefit from advance notice of a disconnect from external power. For example, a security system could record information regarding a manual power unplug event for a security administrator to later analyze, if given notice that a disconnect from external power was about to occur. This information may enable the security administrator to differentiate between possible mischief and other reasons for power failure.

Other examples of electronic devices that could benefit from advance notice of a disconnect from external power include electronic devices that do not include internal power sources, such as portable data storage devices (e.g., Flash drives, external hard drives, etc., which can prevent data loss if advanced notice of an external power disconnect is provided), and mobile wireless devices, such as smartphones (could gather and process latest/real-time information from the internet to build context sensitive information for display to a user, and advanced warning of an external power disconnect would allow the smartphone to accomplish a significant part of data gathering and processing while connected to a high power external power source where a CPU and Wireless interface can perform better than on internal storage, thus reducing latency in displaying information to the user).

Embodiments disclosed herein include electrical systems and related methods for electronic devices 110 to receive sensor inputs that are associated with potential disconnects from power, and related power management.

FIG. 1 is a simplified block diagram of an electrical system 100. The electrical system 100 includes an electronic device 110 and an external power source 130 that is external to the electronic device 110. The electronic device 110 includes an external power port 114 configured to receive external power 136 from the external power source 130. The external power 136 is sufficient to support normal power requirements of the electronic device 110 operating in a normal mode of the electronic device 110. The electronic device 110 also includes control circuitry 116 operably coupled to the external power port 114. The control circuitry 116 is configured to receive sensor inputs 172 from one or more sensors 118 (sometimes referred to herein simply together as "sensors" 118, and individually as "sensor" 118) configured to detect events that are associated with a future disconnect of the external power port 114 from the external power source 130.

The control circuitry 116 is programmed to operate in the normal mode while the external power port 114 is receiving the external power 136. The control circuitry 116 is also programmed to transition to one of a low power mode and a pre-shutdown mode responsive to the sensor inputs 172.

The electronic device 110 may include any electronic device that may benefit from advanced notice of a possible external power disconnect. Non-limiting examples of devices the electronic device 110 may include are an ultra-small form factor computing device, a portable printer, a data storage device, a portable projector, a security system, a mobile wireless device, and other electronic devices.

The external power source 130 may include any of various different power source devices. In some embodiments, the external power source 130 may include a wall adapter (e.g., that plugs directly into an electrical wall socket, a power brick that interfaces with an electrical wall socket through a cord, etc.) configured to convert alternating current (AC) power (e.g., United States standard 110 volt, 60 Hertz power) from an electrical wall socket to a direct current power voltage. In some embodiments, the external power source 130 may be configured to provide AC power from an electrical wall socket (e.g., unconverted) to the electronic device 114. In some embodiments, the external power source 130 may include a wireless power source (e.g., wireless power mat) configured to interface with an electrical wall socket and transmit power wirelessly to the electronic device 110. In some embodiments, the external power source 130 may include a power source of an electronic display (e.g., a USB Type-C interface, a Mobile High-Definition Link (MHL) enabled HDMI interface, etc.).

In some embodiments, the electrical system 100 may also include a transmission device 150 configured to transmit the external power 136 from the external power source 130 to the external power port 114. By way of non-limiting example, the transmission device 150 may include a cable (e.g., a power cable), including at least one connector 152, 154 configured to interface with at least one of the external power port 114 and the external power source 130. Also by way of non-limiting example, the cable may be hardwired to one or more of the external power port 114 and the external power source 130.

In embodiments including the transmission device 150, external power 136 may be prevented from reaching the electronic device 110 if the transmission device 150 is disconnected from either of the electronic device 110 and the external power source, or if the external power source 130 is disconnected from an electrical wall socket or is otherwise deactivated. In order for sensors 118 to adequately cover these possible disconnects of the electronic device 110 from the external power 136, in some embodiments the electronic device 110 and the external power source 130 may each include at least one of the sensors 118. In such embodiments, the sensor 118 of the electronic device 110 may provide sensor input 172 to the control circuitry 116. The external power source 130 may include control circuitry 132 capable of communicating with the control circuitry 116 of the electronic device 110 (e.g., through the external power port 114, the transmission device 150, or combinations thereof). The control circuitry 132 of the external power source 130 may communicate the sensor input 172 to the control circuitry 116. In some embodiments, the transmission device 150 may also include sensors 118 instead of, or in addition to, the electronic device 110 and/or the external power source 130. In such embodiments, the transmission device 150 may include control circuitry 158 configured to deliver the sensor inputs 172 from the sensors of the transmission device 150 to the control circuitry (e.g., through the external power port 114).

In some embodiments, a transmission device 150 may not be included. In such embodiments, at least one of the electronic device 110 and the external power source 130 may include at least one of the sensors 118. By way of non-limiting example, if the external power source 130 is a wireless power mat, it may be sufficient for only the one of the electronic device 110 and the external power source 130 to include at least one of the sensors 118. Also by way of non-limiting example, if the external power source 130 is a power output port of an electronic display device, and the external power port 114 interfaces directly with the external power source, it may be sufficient if the electronic device 110 includes at least one of the sensors 118.

The sensors 118 may include any of a variety of different sensor devices. By way of non-limiting example, the sensors 118 may include proximity sensors, pressure sensors, capacitive touch sensors, infrared sensors, optical sensors, accelerometers, motion sensors, other sensors, or combinations thereof. These sensors 118 may be located strategically within whichever of the electronic device 110, the transmission device 150, and the external power source 130 they are include in to detect when a disconnect event is about to occur. For example, the sensors 118 may be located near the external power port, connectors 152, 154, an off switch of the external power source 130, a connection point of the external power source between the transmission device 150 and the external power source 130, etc. By way of non-limiting example, the transmission device 150 may be an electrical cable including a shield conductor. The shield conductor may function as a sensor 118 (e.g., a capacitive sensor) capable of detecting proximity, touch, or combinations thereof.

As a specific, non-limiting example, if the electronic device 110 includes an HDMI stick, and the external power source 130 includes a wall adapter, the wall adapter may include a capacitive proximity sensor (e.g., a conductive strips acting as sensing elements). When a user approaches the wall adapter to unplug the wall adapter from the wall or turn an off switch of the wall adapter off, the capacitive proximity sensor may signal (e.g., digital signals, analog signals, etc.) to control circuitry 132 in the wall adapter that a possible disconnect event occurred. The control circuitry 132 may indicate the event to the control circuitry 114 of the HDMI stick (e.g., using a Type-C universal serial bus (USB) protocol). The control circuitry 116 of the HDMI stick may then transition to a low power mode to prevent loss of external power 136 during normal operation.

As another specific, non-limiting example, the electronic device 110 may include an HDMI stick, and the external power source 130 may be an electronic display (e.g., the HDMI stick may draw power through an MHL enabled HDMI port or a Type-C enabled USB port). Power disconnect in this situation may only occur if the HDMI stick is disconnected from the electronic display, or if the electronic display power is interrupted (the electronic display is unplugged, or a power switch of the electronic display is switched off). Accordingly, sensors 118 may be placed in the HDMI stick, near a power plug of the electronic display, and a power switch of the electronic display.

As a further specific, non-limiting example, the electronic device 110 may include a wirelessly powered device, and the external power source 130 may include a wireless power mat. The electronic device 110 itself may include the only sensor 118 because power may not be interrupted without touching the electronic device 110. Alternatively, a power plug and/or off switch of the wireless power mat may include sensors 118 proximate thereto, in addition to the sensor 118 of the electronic device 110.

It is contemplated herein that a disconnect of the external power port 114 from external power 136 may not always occur responsive to sensor inputs 172. For example, a user may approach an electronic display functioning as an external power source to engage volume control, and inadvertently trigger a sensor 118 of the electronic display without disconnecting the electronic device 110 therefrom (a false positive). Accordingly, in some embodiments the control circuitry 116 may be programmed to transition back from the one of the low power mode and the off mode to operate in the normal mode if a predetermined amount of time passes without a disconnect of the external power port from the external power source. In some embodiments, the control circuitry 116 may employ probability theory to reduce a likelihood of a false positive.

In some embodiments, the control circuitry 116 may coordinate processing of sensor inputs 172 with at least one of the control circuitry 132 and the control circuitry 158. In some such embodiments, the sensor input 172 from the control circuitry 132, 158 may indicate that the control circuitry 132, 158 determined that a pre-disconnect event occurred. In some embodiments, the control circuitry 116 may process the sensor input 172 alone, and the control circuitry 132, 158 may serve primarily to facilitate communication of the sensor input 172 including signals from the sensors 118 to the control circuitry 116.

In some embodiments (e.g., where the electronic device includes an ultra-small form factor computing device), the electronic device 110 may include an internal power source 112. The internal power source 112 may be configured to provide internal power 120 sufficient to support low power requirements of the electronic device operating in a low power mode. The internal power source may not, however, be configured to provide sufficient internal power 120 to support normal power requirements of the electronic device 110 operating in the normal mode. In such embodiments, the control circuitry 116 may be programmed to transition to the low power mode responsive to the sensor inputs.

In operation, the electronic device 110 may be operating in a normal mode, and the control circuitry 116 may receive a sensor input 172 (e.g., originating at sensors 118 of one or more of the electronic device 110, the transmission device 150, and the external power source) indicating that an event that results in a disconnection of the external power port 114 from the external power source 130 may be about to occur. In response, the control circuitry 116 may transition the electronic device to operate in one of a low power mode and a pre-shutdown mode. The electronic device 110 may thereby avoid ungraceful shutdowns that result from unanticipated power loss. Accordingly, in some instances, the electronic device 110 may perform more smoothly, achieve a relatively longer operational life, and enjoy other advantages.

Figure 2:
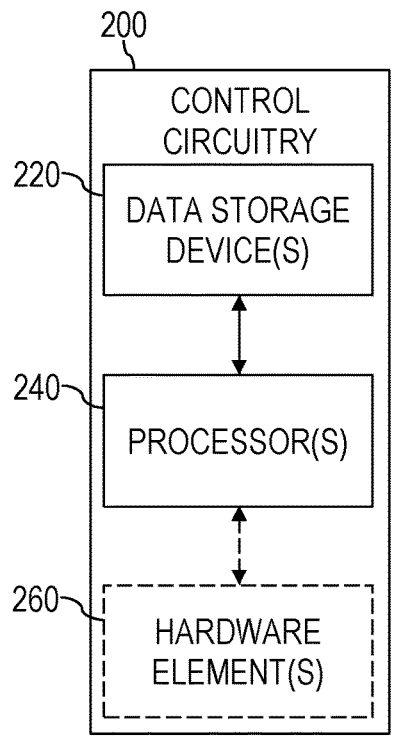
FIG. 2 is a simplified block diagram of example control circuitry that may be used for control circuitry of an electronic device, a transmission device, or an external power source, respectively, of FIG. 1

FIG. 2 is a simplified block diagram of example control circuitry 200 (hereinafter "control circuitry" 200) that may be used for control circuitry 116, 158, or 132 of the electronic device 110, the transmission device 150, or the external power source, respectively, of FIG. 1. The control circuitry 200 includes one or more processors 240 (hereinafter referred to as "processors" 240) operably coupled to one or more data storage devices 220 (hereinafter referred to herein as "storage devices" 220). The storage devices 220 may include volatile data storage devices (e.g., random access memory (RAM)), non-volatile data storage devices (e.g., Flash, Electrically Programmable Read Only Memory (EPROM), hard drives, other non-volatile storage, magnetic discs, optical discs, etc.), other data storage devices, and combinations thereof.

The data storage devices 220 may include computer-readable instructions stored thereon, the computer-readable instructions configured to instruct the processors 240 to perform functions the control circuitry 200 is configured to perform. For example, in embodiments where the control circuitry 200 is used for the control circuitry 116 of the electronic device 110 of FIG. 1, the computer-readable instructions may be configured to instruct the processors 240 to perform functions that the control circuitry 116 is configured to perform (e.g., process sensor inputs 172, operate in a normal mode, operate in a low power mode, transition to and operate in a pre-shutdown mode, etc.). Also, in embodiments where the control circuitry 200 is used for the control circuitry 158 of the transmission device 150 of FIG. 1, the computer-readable instructions may be configured to instruct the processors 240 to perform functions that the transmission device 150 is configured to perform (e.g., transmit sensor input 172 from the sensors 118 of the transmission device 150 to the electronic device 110, etc.). Furthermore, in embodiments where the control circuitry 200 is used for the control circuitry 132 of the external power source 130 of FIG. 1, the computer-readable instructions may be configured to instruct the processors 240 to perform functions that the control circuitry 132 is configured to perform (e.g., transmit sensor input 172 from the sensors 118 of the external power source 130 to the electronic device 110, collaborate with the control circuitry 116 of the electronic device 110 to process the sensor input 172, etc.).

The processors 240 may include a central processing unit (CPU), a microcontroller, a programmable logic controller (PLC), other programmable device, or combinations thereof. The processors 240 may be configured to execute the computer-readable instructions stored on the storage devices 220. In some embodiments, at least a portion of the processors 240 and the storage devices 220 may be implemented in a single device package (e.g., a microcontroller including onboard data storage, etc.).

In some embodiments, the control circuitry 200 may also include one or more hardware elements 260 configured to perform at least a portion of the functions that the control circuitry 200 (e.g., the control circuitry 116, 158, and/or 132 of FIG. 1) is programmed to perform. By way of non-limiting example, the control circuitry 200 may include an application specific integrated circuit (ASIC), system on chip (SOC), arrays of logic gates hard wired to perform functions of the control circuitry 200, arrays of logic gates programmably interfaced (e.g., a field programmable gate array (FPGA)) to perform functions of the control circuitry 200, other hardware elements, or combinations thereof.

Figure 3:
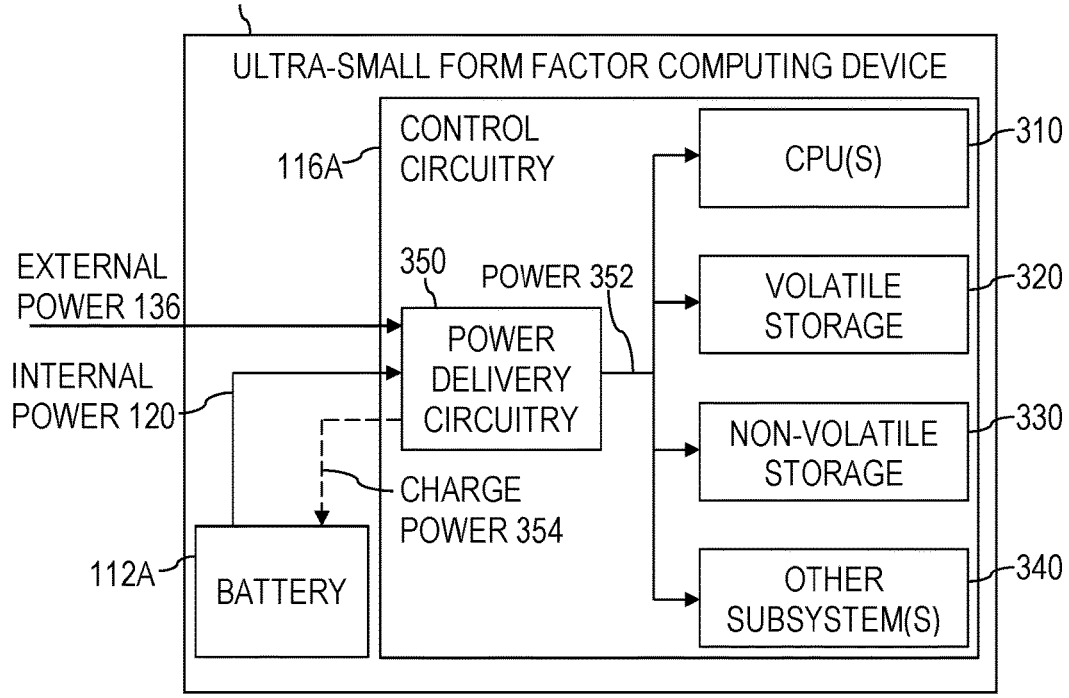
FIG. 3 is an example electronic device of the electronic device of FIG. 1.

FIG. 3 is an example electronic device 110A of the electronic device 110 of FIG. 1. The electronic device 110A includes an ultra-small form factor computing device. Accordingly, the electronic device 110A is sometimes referred to herein as an ultra-small form factor computing device 110A, or simply as computing device 110A. The computing device 110A includes control circuitry 116A including at least one or more central processing units (CPUs) 310, one or more volatile data storage devices 320 (e.g., RAM), and one or more non-volatile data storage devices 330 (e.g., long term storage). The control circuitry 116A may also include one or more other subsystems 340 (input/output (IO) systems, etc.).

The non-volatile storage 330 includes computer-readable instructions stored thereon, the computer-readable instructions configured to instruct the CPUs 310 to execute a software operating system (e.g., Windows, Android, Mac OSX, IOS, Linux, Unix, etc.), and various software applications configured to operate in a software environment provided by the software operating system. The CPUs are configured to transfer the computer-readable instructions to the volatile storage 320 for execution. The computer-readable instructions are also configured to instruct the CPUs to operate the software operating system in a normal mode, a low power mode, and a hibernate mode.

The computing device 110A also includes an internal power source 112A. The internal power source 112A includes an electrochemical energy storage device (i.e., one or more batteries). Accordingly, the internal power source 112A may be referred to herein sometimes as a battery 112A (e.g., a rechargeable battery, a non-rechargeable battery). The battery 112A is not sufficient to support the control circuitry 116A operating in the normal mode. The battery 112A, however, when fully charged, is sufficient to support the control circuitry 116A operating in the low power mode for at least a moderate amount of time. The battery 112A is also sufficient to support the control circuitry 116A operating in the hibernate mode for extended periods of time.

As discussed above with reference to FIG. 1, the control circuitry 116 is configured to receive external power 136 from an external power source 130. The control circuitry 116A may similarly include this feature, as discussed above. The external power 136 is sufficient to sustain the control circuitry 116A operating in the normal mode for at least a moderate amount of time (e.g., a moderate amount of time, extended periods of time, indefinitely, etc.).

The control circuitry further includes power delivery circuitry 350. The power delivery circuit receives external power 136 when the computing device 110A is connected to an external power source 130 (FIG. 1), and distributes power 352 to other components of the control circuitry (e.g., the CPUs 310, the volatile storage 320, the non-volatile storage 330, the other subsystems 340, etc.). In some embodiments, the power delivery circuitry 350 may also be configured to deliver power 352 to components external to the control circuitry 116A (e.g., light emitting diodes, wireless communication interfaces, etc.), or even to components external to the computing device 110A, in some instances. Also, in embodiments where the battery 112A includes a rechargeable battery, the power delivery circuitry 350 may provide charge power 354 to the battery 112A to recharge the battery 112A while the computing device is connected to external power 136.

The battery 112A is configured to provide internal power 120 to the power delivery circuitry 350. As a result, the power delivery circuitry 350 provides power 352 to other components. The power 352 is driven by external power 136 that is received from an external power source 130 (FIG. 1), internal power 120 received from the battery 112A, or combinations thereof. In some embodiments, the power delivery circuitry 350 may convert the external power 136 and/or the battery 112A into a form that is usable by the control circuitry 116A (e.g., from AC power to DC power, from one DC power voltage potential to another DC power voltage potential, etc.).

The computer-readable instructions stored in the non-volatile storage 330 may be configured to instruct the CPUs 310 to transition from the normal mode to the low power mode responsive to sensor inputs 172 (FIG. 1) indicating that a disconnect from external power 136 may be about to occur. A transition from normal mode to a low power mode may occur on the order of about a few milliseconds or less, which is essentially instantaneous to human perception. Accordingly, even if a user is able to disconnect the external power 136 as quickly as about 100 milliseconds after triggering a sensor 118 (FIG. 1), the control circuitry 116A will already be functioning in the low power mode before the external power 136 is disconnected.

The computer-readable instructions stored in the non-volatile storage 330 may also be configured to instruct the CPUs 310 to transition back to the normal mode from the low power mode if a predetermined amount of time (e.g., about 500 milliseconds to several seconds) passes without a disconnect from external power 136. During this predetermined amount of time, the computing device 110A may operate slowly and/or with reduced functionality because the control circuitry 116A is operating in low power mode.

Figure 4:
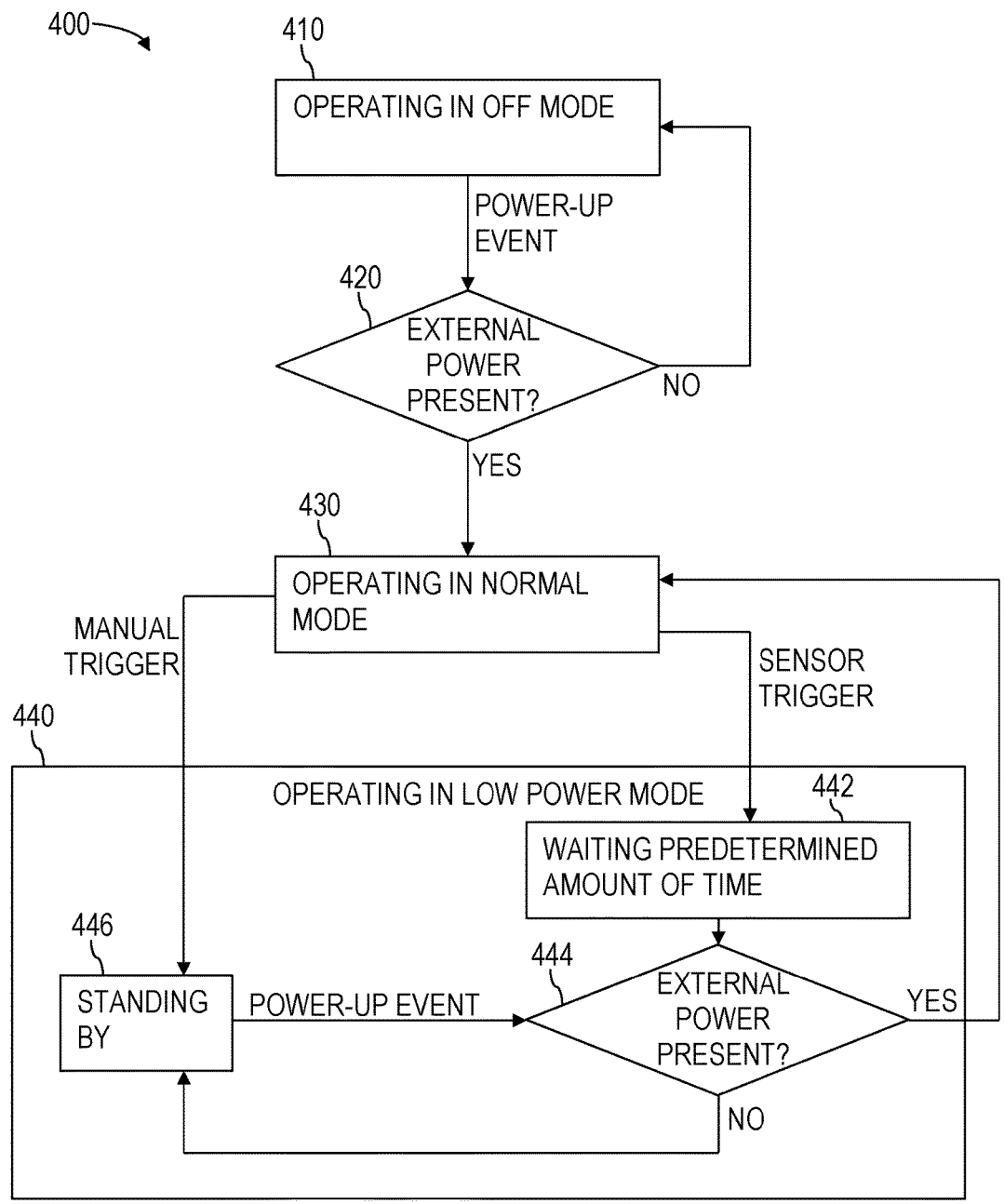
FIG. 4 is a simplified flowchart illustrating an example method of managing power in an ultra-small form factor computing device.

FIG. 4 is a simplified flowchart illustrating an example method 400 of managing power in a an ultra-small form factor computing device, such as the ultra-small form factor computing device 110A of FIG. 3. Accordingly, the non-volatile storage 330 (FIG. 3) may include computer-readable instructions configured to instruct the CPUs 310 (FIG. 3) to perform the method 400 of FIG. 4, in some embodiments. Referring to FIGS. 3 and 4 together, the method 400 includes operating 410 the computing device 110A in an off mode (e.g., the software operating system may be disabled in a pre-boot state, the software operating system may be in a hibernate mode, etc.).

From the off mode, if a power-up event occurs (e.g., a power button is pushed, etc.), it may be determined 420 whether external power 136 is present (i.e., the computing device 110A is connected to an external power source 130 (FIG. 1)). If the external power 136 is not present, the method 400 includes returning to operate 410 in the off mode. Returning to decision 420, if the external power 136 is present, the method 400 includes operating 430 in normal mode.

While operating 430 in the normal mode, if either a manual trigger or a sensor trigger instructs the control circuitry 116A to transfer from the normal mode to the low power mode, the method 400 includes operating 440 in the low power mode. If the trigger was a manual trigger, operating 440 in the low power mode includes standing by 446 in the low power mode. If however, the trigger was a sensor trigger, operating 440 in the low power mode includes waiting 442 a predetermined amount of time (e.g., about 500 milliseconds to several seconds), then determining 444 whether external power 136 is present. If the external power 136 is present, the method 400 includes transitioning from operating 440 in the low power mode to operating 430 in the normal mode. Returning to decision 444, if external power is not present, the method 400 includes standing by 446 while operating 440 in the low power mode.

While standing by 446, if a power-up event occurs (e.g., a power button is pushed, etc.), the method includes determining 444 whether the external power 136 is present. As discussed above, if the external power 136 is present, the method 400 includes transitioning from operating 440 in the low power mode to operating 430 in the normal mode. If, however, the external power 136 is not present, the method 400 includes standing by 446 while operating 440 in the low power mode.

The battery 112A is capable of sustaining low power mode operation of the ultra-small form factor computing device 110A for at least a moderate amount of time. If the external power 136 is not restored within a moderate amount of time, however, the battery 112A will discharge to a point where it cannot continue to support the low power mode. Accordingly, in some embodiments, disclosed herein are electronic devices 110, 110A programmed to transition from the low power mode to a hibernate mode while powered only by the internal power source. In some embodiments, the transition from the low power mode to the high power mode may be programmed (e.g., as computer-readable instructions stored in the non-volatile storage 330) to occur a predetermined amount of time (e.g., about one minute, two minutes, five minutes, ten minutes, etc.) before it is anticipated that the battery 112A will no longer be capable of supporting the low power mode. In some embodiments, the control circuitry 116A may be programmed to commence the transition from the low power mode to the hibernate mode upon a determination that only a predetermined amount of available power remains on the battery 112A.

In some embodiments, the low power mode includes the volatile storage 320 maintaining data that was present in the volatile storage 320 before transitioning from the normal mode to operate 440 in the low power mode. Power 352 may be delivered to the volatile storage 320 by the power delivery circuitry 350 to support this data maintenance. For example, power 352 is consumed by the volatile storage 320 while data is repeatedly read and re-written to the volatile storage 320 (i.e., because volatile storage elements typically do not hold data more than about a second at a time, and sometimes much less than a second at a time). Also, the CPUs 310 may perform background functions, which cause the CPUs to draw power 352 from the power delivery circuitry 350. The non-volatile storage 330 and the other subsystems 340 may also draw power 352 from the power delivery circuitry 350, as well as any external components operating with power derived from the internal power 120.

If the power delivery circuitry 350 fails to deliver adequate power 352 to the components of the control circuitry 116A, an unprepared power-down may occur. If an unprepared power-down occurs, data stored in the volatile storage may be lost, the next power-up may result in a cold boot, and/or the computing device 110A may experience other stresses.

In the hibernate mode, on the other hand, the volatile storage 320 does not maintain a significant amount of data. As a result, if a total loss of power 352 occurs during the hibernate mode, a significant amount of data is not lost. Also, in the hibernate mode operations performed by each of the CPUs 310, the volatile storage 320, the non-volatile storage 330, the other subsystems 340, and other peripheral devices may be scaled back greatly, or stopped altogether. As a result, if total loss of power 352 occurs, cold boots and other system stresses may be avoided.

Typically, however, a transition from a low power mode to a hibernate mode is not considered a low power operation. For example, data stored in the volatile storage 320 is read from the volatile storage 320, and written to non-volatile storage 330 (e.g., in blocks of data). These read and write operations consume relatively large amounts of power 352. All the while, the CPUs 310 coordinate the data transfer from the volatile storage 320 to the non-volatile storage 330, and coordinate halting of input/output activities, all of which amounts to relatively large consumption of power 352.

Figure 5A:
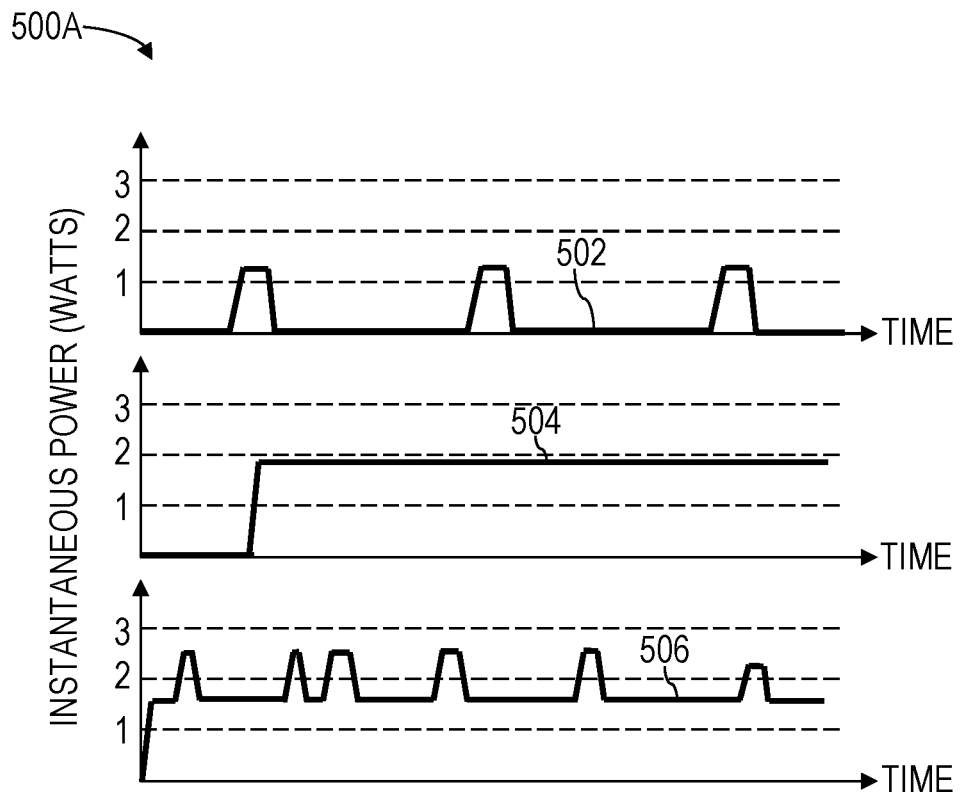
FIG. 5A is a group of plots illustrating examples of power consumption, plotted against time, according to some embodiments.

FIG. 5A is a group 500A of plots 502, 504, 506 illustrating examples of power consumption, plotted against time, that may be made by the volatile storage 320, the non-volatile storage 330, and the CPUs 310, respectively, of FIG. 3 during a transition from a low power mode to a hibernate mode. Referring to FIGS. 3 and 5A together, the power consumption plot 502 of the volatile storage 320 shows a few peaks, which may correspond to block read operations (e.g., LPDDR read) of the volatile storage 320. The power consumption plot 504 of the non-volatile storage 330 shows a ramp up, and substantially continuous power draw, which may correspond to writing of data read from the volatile storage 320 to the non-volatile storage 330. The power consumption plot 506 of the CPUs 310 illustrates a ramp up, then various peaks, as the CPUs 310 perform various tasks.

Taken individually, the power consumption of each of the volatile storage 320, the non-volatile storage 330, and the CPUs 310 may be manageable for the battery 112A. For example, assuming that the battery 112A is rated for about 4 Watts instantaneous power draw, the battery 112A would be capable of supporting any of the power draws illustrated in the group 500A of plots 502, 504, and 506 alone. A total power draw, however, may exceed capacity of the battery 112A.

Figure 5B:
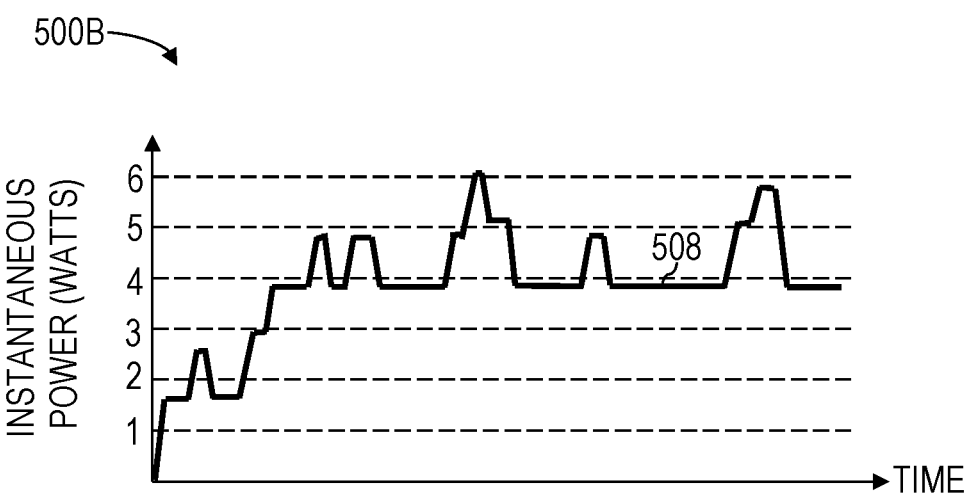
FIG. 5B is an example plot illustrating a total instantaneous power consumption, plotted against time, according to some embodiments.

FIG. 5B is a plot 500B illustrating a total instantaneous power consumption 508, plotted against time, that may be made by the volatile storage 320, the non-volatile storage 330, and the CPUs 310 combined during the transition from the low power mode to the hibernate mode. Referring to FIGS. 3, 5A, and 5B together, this total instantaneous power consumption 508 may be approximately equal to the sum of the quantities shown in plots 502, 504, and 506.

As is apparent from the plot 500B, the total instantaneous power consumption 508 exceeds 4 Watts multiple times. Accordingly, assuming that the capacity of the battery 112A for instantaneous power draw is about 4 Watts, the battery 112A may not be capable of supporting the transition from low power mode to hibernate mode. If the transition takes around ten seconds to perform, the battery 112A may operate outside of its rating for an extended period of time, which may cause interruptions to the processes performed by the control circuitry 116A, and may result in loss of data, subsequent cold boots, and other system stresses.

Accordingly, proposed herein are systems and methods for performing low-power transitions from a low power mode to a hibernate mode. In order to achieve relatively lower total instantaneous power draw, tasks of at least a portion of the CPUs 310, the volatile storage 320, and the non-volatile storage 330 are offset in time so that a limited number of tasks are executed at any given point of time. Although serializing of tasks in this way may extend the amount of time the control circuitry 116A spends transitioning from the low power mode to the hibernate mode, the battery 112A has adequate capacity to support the transition.

Figure 6A:
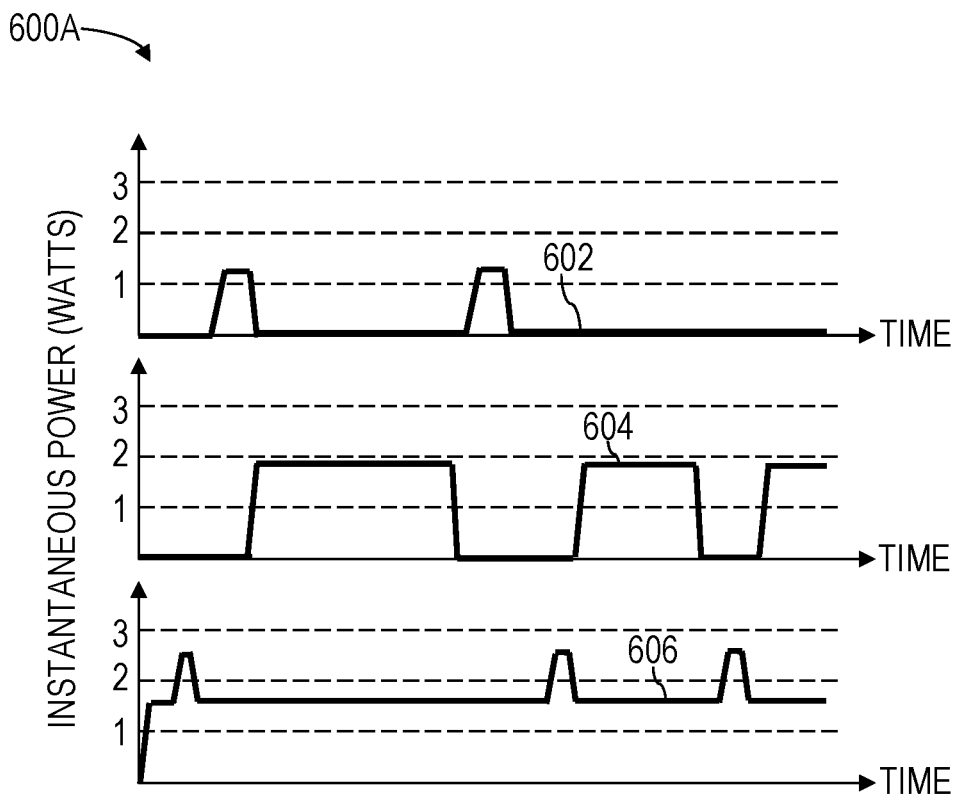
FIG. 6A is another group of plots illustrating examples of power consumption, plotted against time, according to some embodiments.

FIG. 6A is a group 600A of plots 602, 604, 606 illustrating examples of power consumption, plotted against time, that may be made by the volatile storage 320, the non-volatile storage 330, and the CPUs 310, respectively, of FIG. 3 using serialization of tasks. In other words, the volatile storage 320, the non-volatile storage, 330, and the CPUs 310 may take turns performing their respective subtasks. When it is not a turn of one of the volatile storage 320, the non-volatile storage 330, and the CPUs 310, that one may operate in a low power state until it is that one's turn. As illustrated by the group of plots 602, 604, 606, peaks in one of the plots 602, 604, and 606 tend to correspond with valleys in the others of the plots 602, 604, and 606.

Figure 6B:
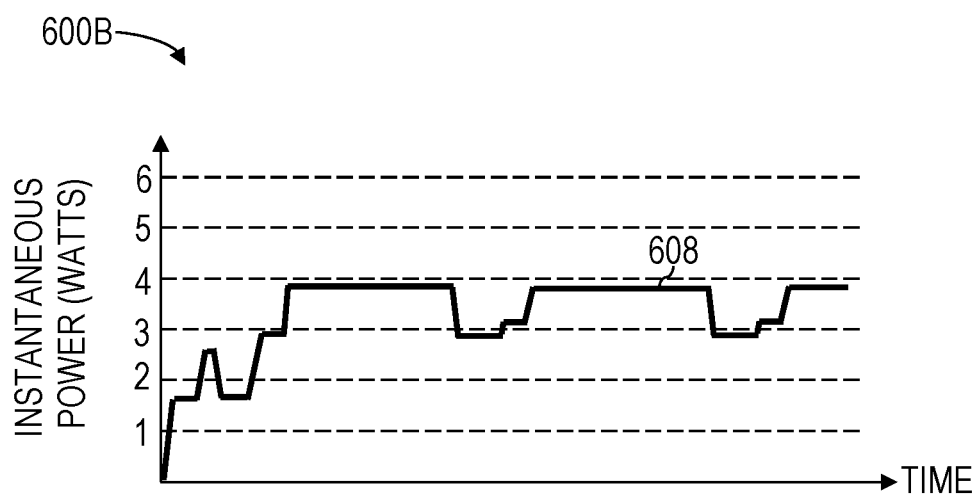
FIG. 6B is another example plot illustrating a total instantaneous power consumption, plotted against time, according to some embodiments.

FIG. 6B is a plot 600B illustrating a total instantaneous power consumption 608, plotted against time, that may be made by the volatile storage 320, the non-volatile storage 330, and the CPUs 310 combined using serialization of tasks. As illustrated in FIG. 6B, the total instantaneous power consumption 608 never exceeds 4 Watts, which may be within the total instantaneous power draw capabilities of the battery 112A (FIG. 3).

Referring FIGS. 3, 6A, and 6B together, in some embodiments, results such as those shown in the plots 600A and 600B may be obtained by sequentially and separately executing tasks of the volatile storage 320, the non-volatile storage 330, and the CPUs 310. By way of non-limiting example, control of reads of volatile storage 320 and writes of non-volatile storage 330 may be modified (e.g., through computer-readable instructions stored on the non-volatile storage 330) to only perform reads of volatile storage 320 after a write of a previous block of data to the non-volatile storage 330 is complete. Also by way of non-limiting example, control of reads of volatile storage 320 and writes of non-volatile storage 330 may be modified to only perform writes to non-volatile storage 330 after a read of a previous block of data from the volatile storage 320 is complete. This concept can be extended to include other relatively high power activities (e.g., high power CPU tasks, etc.). For example, other activities that are executed at relatively high power may be postponed until current reads from the volatile storage 320 and/or current writes to non-volatile storage 330 are completed. Also, this framework may be enhanced by ordering the serially executed tasks based, at least in part, on prioritization of the tasks.

In some embodiments, results such as those shown in the plots 600A and 600B may be obtained by monitoring a total amount of power 352 consumed, and throttling back performance of tasks of at least some of the volatile storage 320, the non-volatile storage 330, and the CPUs 310 (e.g., reads from volatile storage 320, writes to non-volatile storage 330, etc.) if a predetermined maximum instantaneous power is exceeded. In other words, the control circuitry 116A may be programmed to reactively scale back execution of tasks if a predetermined instantaneous power consumption is exceeded. Again, the tasks performed by the control circuitry 116A may be ordered according to priority of execution, and higher priority tasks may be executed earlier than lower priority items. This order of priority may dynamically change and update. For example, when total power consumption exceeds the limit, lower-priority tasks may be postponed until higher-priority tasks are complete.

In some embodiments, results such as those shown in the plots 600A and 600B may be obtained by predictively preventing the control circuitry 116A from exceeding a predetermined total power limit. For example, the control circuitry 116A may be programmed to predict how much power tasks of the transition from the low power mode to the hibernate mode will consume. The control circuitry 116A may then scale back the tasks of the transition to a level that will not result in total instantaneous power consumption exceeding the limit. In such embodiments, it may be possible to prevent total power consumption from ever exceeding a predetermined maximum power limit. Management of external devices, such as external data storage (e.g., external volatile storage, external non-volatile storage, or combinations thereof) may be provided for under this framework.

A non-exhaustive list of examples follows. Each of these examples may be combined with any others of the examples, and with embodiments disclosed herein, except as would be understood by one of ordinary skill to not be combinable.

Example 1

An electrical system, including: an electronic device including: an external power port configured to receive external power from an external power source that is external to the electronic device, the external power sufficient to support normal power requirements of the electronic device operating in a normal mode; and control circuitry operably coupled to the external power port and configured to receive sensor inputs from one or more sensors configured to detect events associated with a future disconnect of the external power port from the external power source, the control circuitry programmed to: operate in the normal mode while the external power port is receiving the external power; and transition to one of a low power mode and a pre-shutdown mode responsive to the sensor inputs.

Example 2

The electrical system of Example 1, wherein the electronic device includes any device selected from the list consisting of an ultra-small form factor computing device, a portable printer, a data storage device, a portable projector, a security system, and a mobile electronic device.

Example 3

The electrical system according to either one of Examples 1 and 2, wherein the electronic device further includes at least one of the one or more sensors.

Example 4

The electrical system according to any one of Examples 1-3, further including the external power source, wherein the external power source includes at least one of the one or more sensors, and control circuitry configured to transmit the sensor inputs from the at least one of the one or more sensors to the electronic device.

Example 5

The electrical system of Example 4, wherein the external power source includes at least one power source selected from the list consisting of a wall adapter, a wireless power source, a universal power source, and an electronic display device.

Example 6

The electrical system according to any one of Examples 1-6, further including a transmission device configured to transmit the external power from the external power source to the external power port, wherein the transmission device includes at least one of the one or more sensors, and control circuitry configured to transmit the sensor inputs from the at least one or more sensors to the electronic device.

Example 7

The electrical system of Example 6, wherein the transmission device includes an electrical cable including a first port configured to interface with the external power source and a second port configured to interface with the external power port, the at least one of the one or more sensors located proximate to at least one of the first port and the second port.

Example 8

The electrical system according to either one of Examples 6 and 7, wherein the transmission device includes an electrical cable including a shield conductor, wherein the at least one of the one or more sensors includes the shield conductor operating as a capacitive sensor.

Example 9

The electrical system according to any one of Examples 1-8, wherein the one or more sensors include at least one sensor selected from the group consisting of proximity sensors, pressure sensors, capacitive touch sensors, infrared sensors, optical sensors, accelerometers, and motion sensors.

Example 10

The electrical system according to any one of Examples 1-9, wherein the control circuitry is further programmed to transition back from the one of the low power mode and the off mode to operating in the normal mode if a predetermined amount of time passes without a disconnect of the external power port from the external power source.

Example 11

The electrical system according to any one of Examples 1-9, wherein the electronic device further includes an internal power source configured to provide internal power sufficient to support low power requirements of the electronic device operating in the low power mode, but not sufficient to support the normal power requirements, and wherein the control circuitry is programmed to transition to the low power mode responsive to the sensor inputs.

Example 12

The electrical system of Example 11, wherein the control circuitry includes at least one central processing unit, at least one volatile data storage device, and at least one non-volatile data storage device.

Example 13

The electrical system of Example 12, wherein the control circuitry is further programmed to transition from the low power mode to a hibernate mode while powered only by the internal power source.

Example 14

The electrical system of Example 13, wherein the control circuitry is further programmed to perform the transition from the low power mode by serially performing volatile data storage device operations and non-volatile data storage device operations.

Example 15

The electrical system of Example 13, wherein the control circuitry is further programmed to perform the transition from the low power mode by prioritizing operations including volatile data storage device operations and non-volatile data storage device operations, and scaling back on performing lower priority ones of the operations if a total instantaneous power consumption of the control circuitry exceeds a predetermined threshold amount of power.

Example 16

The electrical system of Example 13, wherein the control circuitry is further programmed to perform the transition from the low power mode by predicting how much power operations of the transition will consume, and limiting the operations of the transition to those that will not result in the control circuitry instantaneously consuming more than a predetermined threshold amount of power.

Example 17

An electronic device, including: an external power port configured to receive external power from an external power source that is external to the electronic device, the external power sufficient to support normal power requirements of the electronic device operating in a normal mode; an internal power source configured to provide internal power sufficient to support low power requirements of the electronic device operating in a low power mode, but not sufficient to support the normal power requirements; control circuitry operably coupled to the external power port and the internal power source, the control circuitry including at least one or more central processing units, one or more volatile data storage devices, and one or more non-volatile data storage devices, wherein the control circuitry is programmed to transition from the low power mode to a hibernate mode while powered by only the internal power source.

Example 18

The electronic device of Example 17, wherein the control circuitry is programmed to perform at least a portion of the operations of the transition from the low power mode to the hibernate mode sequentially according to a priority, wherein the at least a portion of the operations of the transition includes operations performed with the one or more non-volatile data storage devices and operations performed with the one or more volatile data storage devices.

Example 19

The electronic device of Example 18, wherein the control circuitry is programmed to: perform a read operation of one of the one or more volatile data storage devices only after a previous write operation to one of the one or more non-volatile data storage devices is completed; and perform a write operation to one of the one or more non-volatile data storage devices only after a previous read operation of one of the one or more volatile data storage devices is completed.

Example 20

The electronic device of Example 17, wherein the control circuitry is programmed to scale back on performing operations of the transition from the low power mode to the hibernate mode if power consumption from the internal power source exceeds a predetermined threshold.

Example 21

The electronic device according to either one of Examples 17 and 20, wherein the control circuitry is programmed to cause devices that are external to the electronic device to scale back on performing the operations of the transition from the low power mode to the hibernate mode if the power expenditure of the internal power source exceeds a predetermined threshold.

Example 22

The electronic device of Example 17, wherein the control circuitry is programmed to pre-assess operations of the transition from the low power mode to the hibernate mode, and scale back on performing the operations of the transition if it is predicted that a predetermined threshold power expenditure of the internal power source will exceed a predetermined threshold.

Example 23

The electronic device according to either one of Examples 17 and 22, wherein the control circuitry is programmed to prevent an instantaneous power expenditure of the internal power source from ever exceeding a predetermined threshold during the transition from the low power mode to the hibernate mode.

Example 24

The electronic device according to any one of Examples 17-23, wherein the control circuitry is configured to receive sensor inputs from one or more sensors configured to detect events associated with a future disconnect of the external power port from the external power source, the control circuitry programmed to: operate in the normal mode while the external power port is receiving the external power; and transition to the low power mode responsive to the sensor inputs.

Example 25

The electronic device according to any one of Examples 17-24, wherein the control circuitry is programmed to commence the transition from the low power mode to the hibernate mode upon a determination that only a predetermined amount of available power remains on the internal power source.

Example 26

A method of operating an electronic device, the method including: receiving external power with an electronic device from an external power source that is external to the electronic device, the external power sufficient to support normal power requirements of the electronic device operating in a normal mode; receiving sensor inputs indicating events associated with a future disconnect of the electronic device from the external power source; operating in the normal mode while the electronic device is receiving the external power; and transition to one of a low power mode and a pre-shutdown mode responsive to the sensor inputs.

Example 27

The method of Example 26, wherein receiving external power with an electronic device includes receiving the external power with any device selected from the list consisting of an ultra-small form factor computing device, a portable printer, a data storage device, a portable projector, a security system, and a mobile electronic device.

Example 28

The method according to either one of Examples 26 and, wherein receiving sensor inputs includes receiving the sensor inputs from a sensor of the electronic device.

Example 29

The method according to any one of Examples 26-28, wherein receiving sensor inputs includes receiving the sensor inputs from a sensor of the external power source.

Example 30

The method according to any one of Examples 26-29, wherein receiving external power from an external power source includes receiving the external power from at least one power source selected from the list consisting of a wall adapter, a wireless power source, a universal power source, and an electronic display device.

Example 31

The method according to any one of Examples 26-30, wherein receiving external power from an external power source includes receiving the external power through a transmission device including a sensor, and receiving the sensor inputs at least from the sensor of the transmission device.

Example 32

The method of Example 31, wherein receiving the external power through a transmission device includes receiving the external power through an electrical cable including a first port configured to interface with the external power source and a second port configured to interface with the electronic device.

Example 33

The method according to either one of Examples 31 and 32, wherein receiving the external power through a transmission device includes the transmission device receiving the external power through an electrical cable including a shield conductor of the electrical cable operating as a capacitive sensor.

Example 34

The method according to any one of Examples 26-33, wherein receiving sensor inputs includes receiving the sensor inputs from at least one sensor selected from the group consisting of proximity sensors, pressure sensors, capacitive touch sensors, infrared sensors, optical sensors, accelerometers, and motion sensors.

Example 35

The method according to any one of Examples 26-34, further including transitioning back from the one of the low power mode and the off mode to operating in the normal mode if a predetermined amount of time passes without a disconnect of the external power port from the external power source.

Example 36

The method according to any one of Examples 26-34, further including providing internal power sufficient to support low power requirements of the electronic device operating in the low power mode, but not sufficient to support the normal power requirements, with an internal power source of the electronic device, and transitioning to the low power mode responsive to the sensor inputs.

Example 37

The method of Example 36, wherein receiving external power with an electronic device includes receiving the external power with an electronic device including control circuitry including at least one central processing unit, at least one volatile data storage device, and at least one non-volatile data storage device.

Example 38

The method of Example 37, further including transitioning from the low power mode to a hibernate mode while powered only by the internal power source.

Example 39

The method of Example 38, wherein transitioning from the low power mode to a hibernate mode includes transitioning from the low power mode by serially performing volatile data storage device operations and non-volatile data storage device operations.

Example 40

The method of Example 38, wherein transitioning from the low power mode to a hibernate mode includes prioritizing operations including volatile data storage device operations and non-volatile data storage device operations, and scaling back on performing lower priority ones of the operations if a total instantaneous power consumption of the control circuitry exceeds a predetermined threshold amount of power.

Example 41

The method of Example 38, wherein transitioning from the low power mode to a hibernate mode includes predicting how much power operations of the transition will consume, and limiting the operations of the transition to those that will not result in the control circuitry instantaneously consuming more than a predetermined threshold amount of power.

Example 42

A method of operating an electronic device, the method including: receiving external power with an electronic device from an external power source that is external to the electronic device, the external power sufficient to support normal power requirements of the electronic device operating in a normal mode; providing internal power sufficient to support low power requirements of the electronic device operating in a low power mode, but not sufficient to support the normal power requirements, with an internal power source of the electronic device; and transitioning from the low power mode to a hibernate mode while powered only by the internal power source.

Example 43

The method of Example 42, wherein transitioning from the low power mode to a hibernate mode includes perform at least a portion of operations of the transition from the low power mode to the hibernate mode sequentially according to a priority, wherein the at least a portion of the operations of the transition includes operations performed with one or more non-volatile data storage devices and operations performed with one or more volatile data storage devices.

Example 44

The method of Example 43, wherein transitioning from the low power mode a hibernate mode includes: performing a read operation of one of the one or more volatile data storage devices only after a previous write operation to one of the one or more non-volatile data storage devices is completed; and performing a write operation to one of the one or more non-volatile data storage devices only after a previous read operation of one of the one or more volatile data storage devices is completed.

Example 45

The method of Example 42, wherein transitioning from the low power mode to a hibernate mode scaling back on performing operations of the transition from the low power mode to the hibernate mode if power consumption from the internal power source exceeds a predetermined threshold.

Example 46

The method according to either one of Examples 42 and 45, wherein transitioning from the low power mode to a hibernate mode includes causing devices that are external to the electronic device to scale back on performing the operations of the transition from the low power mode to the hibernate mode if the power expenditure of the internal power source exceeds a predetermined threshold.

Example 47

The method of Example 42, wherein transitioning from the low power mode to a hibernate mode includes pre-assessing operations of the transition from the low power mode to the hibernate mode, and scaling back on performing the operations of the transition if it is predicted that a predetermined threshold power expenditure of the internal power source will exceed a predetermined threshold.

Example 48

The method according to either one of Examples 42 and 47, further including preventing an instantaneous power expenditure of the internal power source from ever exceeding a predetermined threshold during the transition from the low power mode to the hibernate mode.

Example 49

The method according to any one of Examples 42-48, further including receive sensor inputs from one or more sensors configured to detect events associated with a future disconnect of the electronic device from the external power source; operate the electronic device in the normal mode while the electronic device is receiving the external power; and transitioning to the low power mode responsive to the sensor inputs.

Example 50

The method according to any one of Examples 42-49, wherein transitioning from the low power mode to a hibernate mode includes commencing the transition from the low power mode to the hibernate mode upon a determination that only a predetermined amount of available power remains on the internal power source.

Example 51

One or more computer-readable storage media including computer readable instructions stored thereon, the computer-readable instructions configured to instruct one or more processors communicatively coupled to the one or more computer-readable storage media to perform any one of the methods recited in Examples 26-50.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure, as contemplated by the inventors.

The invention claimed is:

1. An electrical system, comprising:
an electronic device comprising:
an external power port configured to receive external power from an external power source that is external to the electronic device, the external power sufficient to support normal power requirements of the electronic device operating in a normal mode; and
control circuitry coupled to the external power port and configured to receive sensor inputs from one or more sensors configured to detect events associated with a future disconnect of the external power port from the external power source prior to the future disconnect of the external power port from the external power source, the control circuitry programmed to:
operate in the normal mode while the external power port is receiving the external power; and
transition to one of a low power mode and a pre-shutdown mode responsive to the sensor inputs;
wherein the one or more sensors comprise at least one sensor selected from the group consisting of a proximity sensor, a capacitive touch sensor, an infrared sensor, an optical sensor, an accelerometer, or a motion sensor.

2. The electrical system of claim 1, wherein the electronic device comprises any device selected from the list consisting of an ultra-small form factor computing device, a portable printer, a data storage device, a portable projector, a security system, and a mobile electronic device.

3. The electrical system of claim 1, wherein the electronic device further comprises at least one of the one or more sensors.

4. The electrical system of claim 1, further comprising the external power source, wherein the external power source comprises at least one of the one or more sensors, and control circuitry configured to transmit the sensor inputs from the at least one of the one or more sensors to the electronic device.

5. The electrical system of claim 4, wherein the external power source comprises at least one power source selected from the list consisting of a wall adapter, a wireless power source, a universal power source, and an electronic display device.

6. The electrical system of claim 1, further comprising a transmission device configured to transmit the external power from the external power source to the external power port, wherein the transmission device includes at least one of the one or more sensors, and control circuitry configured to transmit the sensor inputs from the at least one or more sensors to the electronic device.

7. The electrical system of claim 6, wherein the transmission device comprises an electrical cable including a first port configured to interface with the external power source and a second port configured to interface with the external power port, the at least one of the one or more sensors located proximate to at least one of the first port and the second port.

8. The electrical system of claim 6, wherein the transmission device comprises an electrical cable including a shield conductor, wherein the at least one of the one or more sensors comprises the shield conductor operating as a capacitive sensor.

9. The electrical system of claim 1, wherein the one or more sensors also comprise at least one pressure sensor.

10. The electrical system of claim 1, wherein the control circuitry is further programmed to transition back from the one of the low power mode and the off mode to operating in the normal mode if a predetermined amount of time passes without a disconnect of the external power port from the external power source.

11. The electrical system of claim 1, wherein the electronic device further comprises an internal power source configured to provide internal power sufficient to support low power requirements of the electronic device operating in the low power mode, but not sufficient to support the normal power requirements, and wherein the control circuitry is programmed to transition to the low power mode responsive to the sensor inputs.

12. The electrical system of claim 11, wherein the control circuitry comprises at least one central processing unit, at least one volatile data storage device, and at least one non-volatile data storage device.

13. The electrical system of claim 12, wherein the control circuitry is further programmed to transition from the low power mode to a hibernate mode while powered only by the internal power source.

14. The electrical system of claim 13, wherein the control circuitry is further programmed to perform the transition from the low power mode by serially performing volatile data storage device operations and non-volatile data storage device operations.

15. The electrical system of claim 13, wherein the control circuitry is further programmed to perform the transition from the low power mode by prioritizing operations including volatile data storage device operations and non-volatile data storage device operations, and scaling back on performing lower priority ones of the operations if a total instantaneous power consumption of the control circuitry exceeds a predetermined threshold amount of power.

16. The electrical system of claim 13, wherein the control circuitry is further programmed to perform the transition from the low power mode by predicting how much power operations of the transition will consume, and limiting the operations of the transition to those that will not result in the control circuitry instantaneously consuming more than a predetermined threshold amount of power.

17. An electronic device, comprising:
an external power port configured to receive external power from an external power source that is external to the electronic device, the external power sufficient to support normal power requirements of the electronic device operating in a normal mode;
an internal power source configured to provide internal power sufficient to support low power requirements of the electronic device operating in a low power mode, but not sufficient to support the normal power requirements;

control circuitry coupled to the external power port and the internal power source, the control circuitry comprising at least one or more central processing units, one or more volatile data storage devices, and one or more non-volatile data storage devices, wherein the control circuitry is programmed to:

transition from the low power mode to a hibernate mode while powered by only the internal power source;

process sensor inputs received from one or more sensors configured to detect events associated with a future disconnect of the external power port from the external power source prior to the future disconnect of the external power port from the external power source;

operate in the normal mode while the external power port is receiving the external power; and transition to the low power mode responsive to the sensor inputs;

wherein the one or more sensors comprise at least one sensor selected from the group consisting of a proximity sensor, a capacitive touch sensor, an infrared sensor, an optical sensor, an accelerometer, or a motion sensor.

18. The electronic device of claim 17, wherein the control circuitry is programmed to perform at least a portion of the operations of the transition from the low power mode to the hibernate mode sequentially according to a priority, wherein the at least a portion of the operations of the transition comprises operations performed with the one or more non-volatile data storage devices and operations performed with the one or more volatile data storage devices.

19. The electronic device of claim 18, wherein the control circuitry is programmed to:

perform a read operation of one of the one or more volatile data storage devices only after a previous write operation to one of the one or more non-volatile data storage devices is completed; and perform a write operation to one of the one or more non-volatile data storage devices only after a previous read operation of one of the one or more volatile data storage devices is completed.

20. The electronic device of claim 17, wherein the control circuitry is programmed to scale back on performing operations of the transition from the low power mode to the hibernate mode if power consumption from the internal power source exceeds a predetermined threshold.

21. The electronic device of claim 17, wherein the control circuitry is programmed to cause devices that are external to the electronic device to scale back on performing the operations of the transition from the low power mode to the hibernate mode if the power expenditure of the internal power source exceeds a predetermined threshold.

22. The electronic device of claim 17, wherein the control circuitry is programmed to pre-assess operations of the transition from the low power mode to the hibernate mode, and scale back on performing the operations of the transition if it is predicted that a predetermined threshold power expenditure of the internal power source will exceed a predetermined threshold.

23. The electronic device of claim 17, wherein the control circuitry is programmed to prevent an instantaneous power expenditure of the internal power source from ever exceeding a predetermined threshold during the transition from the low power mode to the hibernate mode.

24. The electronic device of claim 17, wherein the control circuitry is programmed to commence the transition from the low power mode to the hibernate mode upon a determination that only a predetermined amount of available power remains on the internal power source.

\* \* \* \* \*